United States Patent [19]

Risberg

[11] 4,180,767

[45] Dec. 25, 1979

[54] CLOSED-LOOP REGULATING AND OVERHAULING LOAD ENERGY DISSIPATING CHOPPER TYPE CURRENT CONTROL SYSTEM FOR D.C. MOTORS

[75] Inventor: Robert L. Risberg, Milwaukee, Wis.

[73] Assignee: Cutler-Hammer, Inc., Milwaukee, Wis.

[21] Appl. No.: 167,453

[22] Filed: Jul. 29, 1971

Related U.S. Application Data

[63] Continuation of Ser. No. 877,923, Nov. 10, 1969, abandoned, which is a continuation of Ser. No. 637,530, May 10, 1967, abandoned.

[51] Int. Cl.$^2$ .............................................. H02P 5/00
[52] U.S. Cl. .............................. 318/308; 318/345 R; 363/138; 363/27
[58] Field of Search .................. 318/308, 345 R, 332, 318/331; 321/44, 18; 363/138, 27

[56] References Cited

U.S. PATENT DOCUMENTS

| | | | |
|---|---|---|---|
| 3,086,156 | 4/1963 | Geissing | 318/308 |
| 3,250,978 | 5/1966 | Moscardi | 318/345 |
| 3,355,654 | 11/1967 | Risberg | 321/44 |
| 3,452,266 | 6/1969 | Borden et al. | 321/18 |

Primary Examiner—Robert J. Hickey

[57] ABSTRACT

A "chopper" type armature current control system for a D.C. motor when connected across the output of a rectifier, A.C. to D.C. type supply source that is characterized by having closed-loop regulating control, and having overhauling load energy dissipating circuit which is automatically connected between the motor armature circuit and the low potential side of the source output whenever the potential across the output sides of the source exceeds a predetermined value. A modified form provides addition of a fixed D.C. potential to afford enhanced speed of system response, and controlled slow speed reverse operation of the motor.

11 Claims, 8 Drawing Figures

CLOSED-LOOP REGULATING AND OVERHAULING LOAD ENERGY DISSIPATING CHOPPER TYPE CURRENT CONTROL SYSTEM FOR D.C. MOTORS

This application is a continuation of my application Ser. No. 877,923, filed Nov. 10, 1969, now abandoned, which is a continuation of Ser. No. 637,530, filed May 10, 1967, now abandoned.

BACKGROUND OF THE INVENTION

This invention relates to a system for controlling flow of current to and dissipating energy from a D.C. motor connected to the output of a rectified A.C. or D.C. supply source.

The Moscardi U.S. Pat. No. 3,250,978 discloses a system for controlling the flow of energy to and from a D.C. motor connected to a D.C. supply having substantially a constant potential, such as provided by a battery or rotary D.C. generator. In Moscardi the motor armature circuit is connected between the low potential side of the source and the center tap of an inductor which is connected at both of its ends through controllable electronic devices to the opposite sides of the source. By suitable oscillator based control means in circuit with the electronic devices and by use of capacitors connected between the opposite sides of the source and the tap of the inductor, the electronic devices can be switched on-and-off in an alternate manner to provide a "chopper" type of current control in the motor armature circuit. Diodes connected in parallel with the capacitors and poled in a direction opposite the direction of current flow in the electronic devices permits continued armature current flow when no energy is being supplied from the source, and also affords pump-back of energy to the source under overhauling conditions of motor operations.

The control of the electronic devices of Moscardi is of the open-loop type which precludes close control of speed deviation under changing loads. Moreover, it cannot be used with a rectifier, A.C. to D.C. type of supply if the motor is subjected to overhauling loads of any appreciable magnitude and duration.

SUMMARY

It is an object of the present invention to provide an improved control system for D.C. motors of the aforementioned type which is suitable for handling and dissipating overhauling energy when connected for supply from a rectifier, A.C. to D.C. type supply source.

Another object of the invention is to provide a system of the aforementioned type which has a novel, closed loop form of regulating control which is responsive to deviation from a preset but adjustable speed reference to regulate the energy supplied to and dissipated from the motor armature to maintain substantially constant motor speed.

And, a still further object of the invention is to provide a modified form affording improved speed of response of the armature current regulating system over a wide speed range, and also slow speed reverse motor operation.

These and other objects are accomplished by providing a basic armature control circuit of the type disclosed in the Moscarcdi U.S. Pat. No. 3,250,978. This is connected across the output side of a rectifier A.C. to D.C. supply source with the armature of a D.C. motor. To this is added an energy dissipating circuit between the low potential side of the source output and the point common between the armature circuit, the switching inductor, capacitors and diodes. Auxiliary control responsive to build-up of the potential across the output side of the source above a predetermined value during overhauling motor operating condition triggers an electronic control device into conduction to accept overhauling armature current in an energy absorbing resistor path.

Closed-loop regulating control is also provided to maintain substantially constant motor speed operation. As shown in block diagram this is accomplished by providing an adjustable reference potential, then comparing this in a circuit against a potential varying with motor speed to provide a resultant control potential, translating this to provide a torque reference potential and comparing this torque (current) reference with actual motor torque (current). Control means responsive to the difference between torque reference potential and torque feedback potential increasing above a given value triggers "on" one of the main switching electronic control devices to increase the motor armature current from the source. When the control torque error potential subsides below such given value the other main switching electronic control device is triggered "on" to decrease the flow of current from the source into the motor armature.

A modified form of control provides addition of a fixed D.C. potential in series with the last mentioned main switching electronic device. This improves the rate of system response and also affords regulated low speed reverse operation of the motor.

Other objects and advantages of the invention will hereinafter appear.

The accompanying drawings illustrate preferred embodiments of the invention which will now be described in detail, it being understood that the embodiments illustrated are susceptible of modifications with respect to details without departing from the scope of the appended claims.

DESCRIPTION OF PREFERRED EMBODIMENTS

Figure 1:
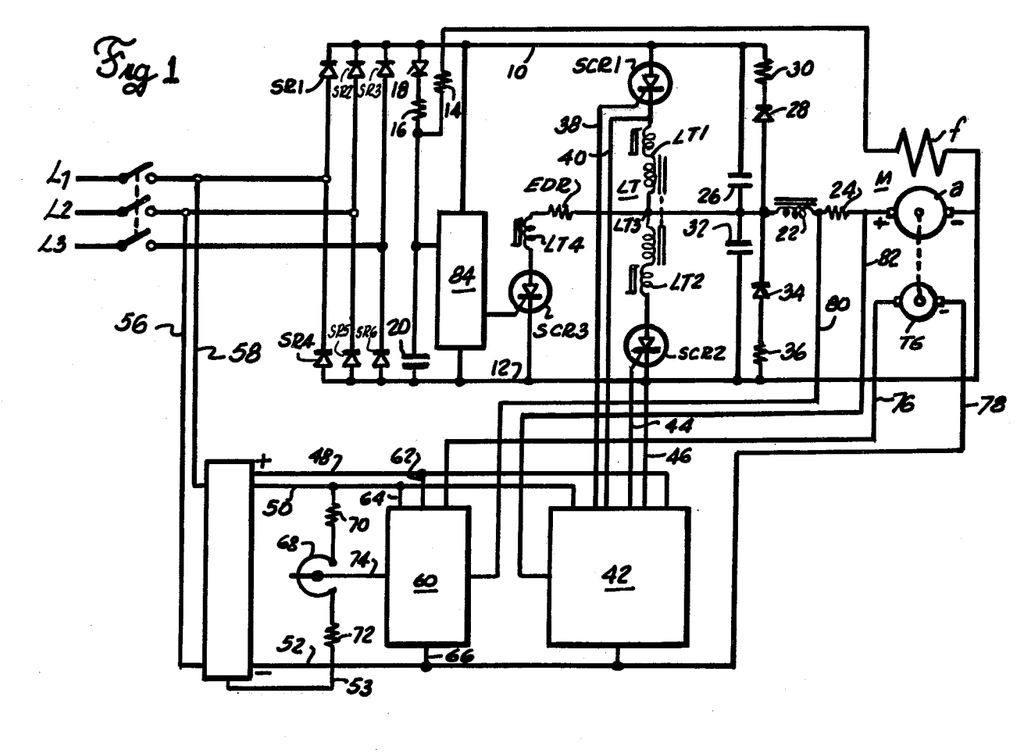
FIG. 1 is a partially diagrammatic and partially schematic showing of a current supplying system for a direct current motor made in accordance with the invention.

Referring to FIG. 1, a D.C. motor is shown having an armature a and field winding f. Armature a and field winding f are connected to a source of rectified D.C. voltage which comprises a three-phase A.C. source including phase supply lines L1, L2 and L3 and rectifiers SR1 to SR6. Rectifiers SR1 to SR3 are connected in parallel between each of lines L1, L2 and L3 and a high potential unidirectional supply bus 10, and recifiers SR4 to SR6 are connected between a low potential unidirectional supply bus 12 and lines L1, L2 and L3, respectively.

Field winding f is connected at one end to the right-hand terminal of motor armature a and at its other end in series with resistors 14 and 16 and a diode 18 to bus 10. Diode 18 and resistor 16 are connected in series with a capacitor 20 across the buses 10 and 12.

A semiconductor controlled rectifier SCR1 is connected from bus 10 in series with the upper half LT1 of a center-tapped inductor LT, and a choke coil 22 and resistor 24 to the positive terminal of armature a. The lower half LT2 of inductor winding LT is connected at its one end to the point common to inductor LT1 and choke coil 22 and is connected at its other end in series with the anode-cathode circuit of a semiconductor controlled rectifier SCR2 to bus 12.

A capacitor 26 and parallel series combination of a diode 28 and resistor 30 are connected between the point common between LT1, LT2 and choke 22 and bus 10. Similarly, a capacitor 32 and parallel series combination of a diode 34 and resistor 36 is connected between the aforementioned common point and bus 12.

The control electrode and cathode of SCR1 are connected through lines 38 and 40 to a firing control circuit 42 schematically depicted in FIG. 1. Likewise, the control electrode and cathode of SCR2 are connected through lines 44 and 46 to circuit 42. Circuit 42 is connected through high, intermediate and low potential buses 48, 50 and 52, respectively, to a regulated D.C. power supply circuit 54, also schematically depicted in FIG. 1. D.C. circuit 54 has connections through input buses 56 and 58 to lines L1 and L2 of the A.C. supply source.

A comparator circuit 60 which is likewise schematically depicted in FIG. 1, has input connections through lines 62, 64 and 66 to D.C. buses 48, 50 and 52, respectively. Buses 48 and 50 are respectively at high and intermediate positive potentials with respect to bus 52 which is the common return bus, and bus 53 is at a negative potential with respect to bus 52. A speed reference setting potentiometer 68 has its resistance element connected through resistors 70 and 72 to buses 50 and 53 and has its adjustable tap connected through a line 74 to comparator circuit 60. Circuit 60 is connected through a line 76 to one terminal of a tachometer generator TG driven by armature a. The other terminal of TG is connected through a line 78 to bus 52. A line 80 connects the point common to choke 22 and load resistor 24 to comparator circuit 60, and a line 82 connects the point common between resistor 24 and a terminal of armature a to firing control circuit 42.

The system as thus far described is similar in design and operation to that shown and described in the Moscardi U.S. Pat. No. 3,250,978, issued May 10, 1966. Silicon controlled rectifiers SCR1 and SCR2, capacitors 26 and 32, and diodes 28 and 34 as shown, provide a power switching circuit whereby current flow between bus 10 through armature a of the motor under motoring conditions can be regulated, and electrical energy stored in the armature circuit of the motor and in inductor 22 can be pumped back into bus 10 during regenerative or overhauling operation of the motor.

Control is accomplished by alternatively rendering SCR1 and SCR2 conducting. Inductor LT can comprise either a single, center tapped or two like windings wound on a single core. When SCR1 fires, capacitor 26 in shunt therewith discharges into inductor LT. By transformer action a voltage is induced in the portion of the inductor in series with SCR2 which was conducting for a sufficient time to render the latter nonconducting. It will be seen that the same action occurs with respect to SCR2, capacitor 32 and SCR1 when the former is thereafter rendered conducting.

When SCR1 is conducting, current is supplied to the motor armature circuit inductance of inductor 22. Conduction of SCR2 cuts off supply of voltage from bus 10 and the stored energy in the motor armature circuit continues to flow clockwise through diode 34, inductor 22, resistor 24 and armature a in a "free wheeling" mode.

The foregoing brief description pertains to conditions when the motor is driving or supplying positive torque to the load. Now if the load overhauls the motor, or development of negative torque is desired, the system as thus far described, will function to pump back energy into bus 10 whenever SCR1 is pulsed for conduction. SCR2 will be left on until direction of current flow is caused to reverse by motor countervoltage. When SCR1 is pulsed for conduction, the circuit is suddenly changed to armature a and inductor 22 across the buses 10 and 12. The current build up with inductor shorting the motor terminals when SCR2 is on cannot stop instantaneously, and a potential is induced by inductor 22 which adds to the motor counter e.m.f. to maintain current flow. The potential at LT3 rises rapidly and when it exceeds that of bus 10 current will flow through diode 28 and resistor 30 to bus 10 under SCR2 is again pulsed into conduction. Pumping back into bus 10 is satisfactory if the buses 10 and 12 are supplied from a battery or D.C. supply railway system, but cannot be tolerated where they are supplied through rectifiers from an A.C. source. The load thus sees a constant potential bilateral source looking back with SCR3 and SCR1 on. Regenerative load current is therefore linearly decayed.

In accordance with the present invention, SCR3 and an inductor LT4 are connected in series with an energy dissipating resistor EDR between LT3 and bus 12. A detector circuit 84, schematically depicted in FIG. 1, functions to detect a rise in potential between buses 10 and 12 a predetermined amount above the normal rectified supply potential therebetween to pulse SCR3 into conduction. Thus during regenerative operation of the motor if the current pumped back to bus 10 during the period when SCR2 is nonconducting causes bus 10 to raise too high in potential SCR3 is pulsed into conduction to divert the flow of regenerative current through resistor EDR to bus 12. SCR1 is left on during this invterval causing potential across the resistor to be constant full bus potential independent of the magnitude of the regenerative current. Thus when SCR3 is pulsed on currents will flow from bus 10 through SCR1 to resistor EDR and regenerative current from load to resistor. SCR3 remains conducting until SCR2 is again pulsed into conduction, and as the conduction of SCR2 effectively shunts SCR3 the latter is rendered nonconducting.

Figure 2A:
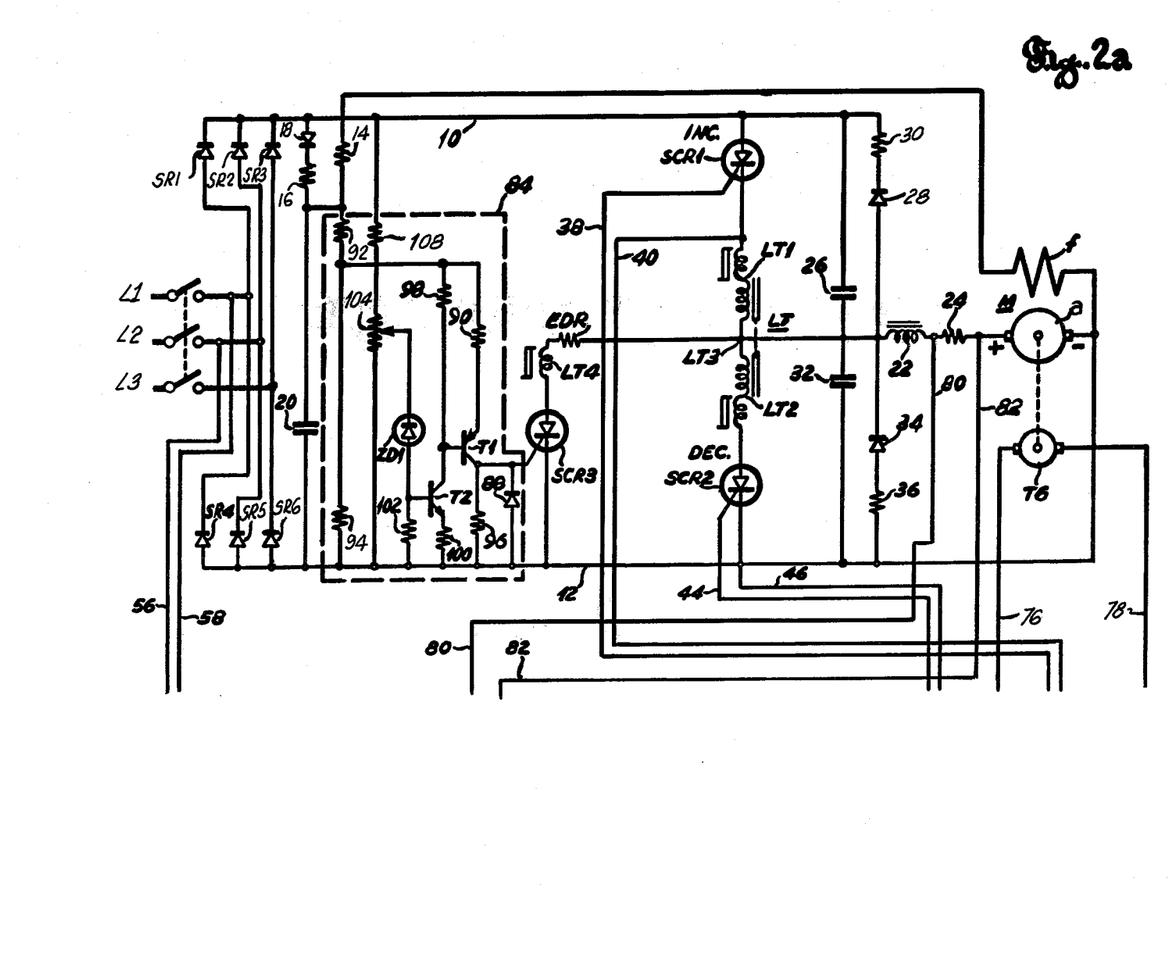
FIGS. 2a and 2b, taken together, are a complete diagrammatic showing of the system shown in FIG. 1.
Figure 2B:
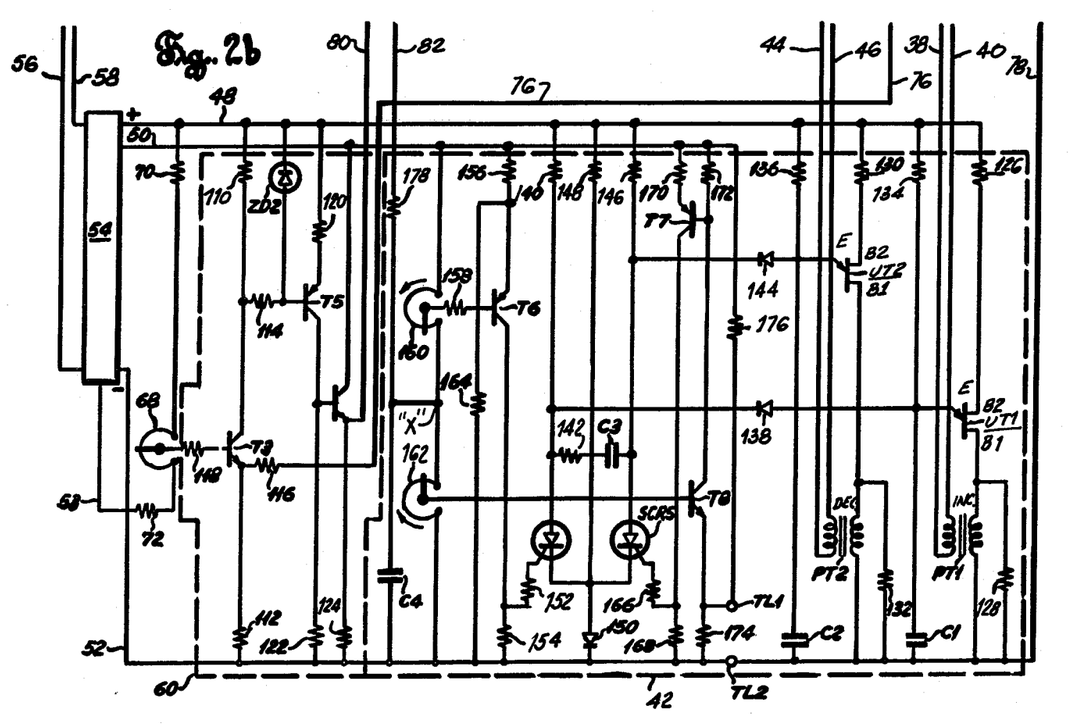

Circuits 42, 60 and 84 will now be described in detail in connection with FIGS. 2a and 2b. FIGS. 2a and 2b, when arranged with FIG. 2a topmost and alined with corresponding portions of FIG. 2b affords a diagrammatic showing of a complete control system embodying the various aspects of the present invention.

Detector circuit 84 comprises a P-N-P type transistor T1, an N-P-N type transistor T2, a zener diode ZD1 and a diode 88. The emitter of T1 is connected in series with a resistor 90 to the common point between voltage resistors 92 and 94 of a voltage divider. The upper end of resistor 92 is connected to the common point between resistors 14 and 16, and the lower end of resistor 94 is connected to bus 12. The collector of T1 is connected through a resistor 96 to bus 12 and is also connected to the gate electrode of SCR3. Diode 88 is connected between bus 12 and the gate of SCR3 and poled as shown. The base of T1 and collector of T2 are connected in series with a resistor 98 to the common point between resistors 92 and 94.

The emitter and base of T2 are connected through resistors 100 and 102 to bus 12. The base of T2 is connected in series with zener diode ZD1 to the adjustable tap of a potentiometer 104 which has the lower end of its resistance element connected to bus 12 and its upper end in series with a resistor 106 to bus 10.

When the voltage at the adjustable tap of potentiometer 104 exceeds the zener voltage of ZD1 the latter conducts thereby elevating the base of transistor T2 to a potential rendering the latter conducting. Conduction of T2 results in a lowering of the potential of the base of transistor T1 to a value which in turn renders the latter transistor conducting. When T1 conducts the gate of SCR3 is subjected to a firing current that turns the latter on to conduct current as aforedescribed. Once conducting, SCR3 remains on until SCR2 is thereafter rendered conducting. Adjustment of the tap of potentiometer 104 permits adjustment, within limits, of the potential of bus 10 at which ZD1 "breaks down" to initiate turn-on of SCR3.

Comparator circuit 60 comprises N-P-N type transistors T3 and T4, a P-N-P type transistor T5 and a zener diode ZD2. Transistor T3 has its collector connected in series with a resistor 110 to high potential D.C. bus 48 and has its emitter connected in series with a resistor 112 to low potential bus 52. The collector of T3 is also connected in series with a resistor 114 to the base of transistor T5, and its emitter is also connected in series with a resistor 116 to line 76 which has connection with an output terminal of tachometer generator TG. The base of T3 is connected in series with a resistor 118 to the adjustable tap of speed reference setting potentiometer 68.

The base of T5 is also connected in series with zener diode ZD2 to bus 48, and the emitter of T5 is connected to bus 48 in series with a resistor 120. The collector of T5 is connected to the base of transistor T4 and also in series with a resistor 122 to bus 52. The collector of T4 is connected to intermediate potential bus 50, and the emitter of T4 is connected through line 80 to the common point between choke coil 22 and resistor 24 and also in series with a resistor 124 to bus 52.

Transistor T3 will have a level of conduction proportional to the difference between the setting of the tap of speed reference potentiometer 68 and the tachometer voltage as divided by resistors 116 and 112. For a given level of conduction of T3, and neglecting the effect of tachometer generator feedback at the emitter terminal of T3, there will be a given potential at the base of transistor T5 with respect to bus 48. This latter potential will cause T5 to conduct, and T5 will conduct more as such base to bus 48 potential is lowered. However, the degree of turn-on of T5 is limited by zener diode ZD2 which will break down when the potential across resistors 110 and 114 exceed its zener voltage.

Increasing the conduction of T5 raises the potential of the base of transistor T4 to cause increased output voltage of the latter. Conversely, decrease in conduction of T5 lowers the potential of the base of T4 to cause a decrease in output voltage of the latter.

Now when the motor starts from rest there is zero feedback voltage from generator TG and hence the potential level on the base of T5 will be purely a function of the setting of potentiometer 68. As the speed of motor M increases so the output potential of TG to which the emitter terminal of T3 is subjected, increases. Thus the base emitter current flow in T3 is reduced thereby decreasing the level of conduction of the latter. From the foregoing description of action of T3, T5 and T4, it will be seen that this results in decrease in the output of T5 and T4, and a consequent lowering of the potential of T4 emitter terminal with respect to bus 52. If after the motor is up to desired speed there is a decrease in motor speed it will be seen that the potential of the emitter terminal of T4 will increase relative to bus 52 in proportion to the decrease in speed. The potential at the emitter terminal of T4, as will hereafter be more clearly apparent, provides a "torque" reference potential for firing control circuit 42.

Firing control circuit 42 comprises pulsing transformers PT1 and PT2 and unijunction transistors UT1 and UT2, respectively, associated with and controlling the conduction of SCR1 and SCR2. Transformer PT1 has its primary winding connected across buses 48 and 52 in series with the interbase circuit B1-B2 of unijunction transistor UT1 and a resistor 126. A resistor 128 is connected in shunt across the primary winding of PT1. One end of the secondary winding is connected through line 38 to the gate of SCR1 and the other end of the latter winding is connected through line 40 to the cathode of SCR1. Similarly, the primary winding of transformer PT2 is connected in series with the interbase circuit B1-B2 of unijunction transistor UT2 and a resistor 130 to bus 48. A resistor 132 is connected in shunt with the primary winding of PT2. The secondary winding of PT2 is connected at one end through line 44 to the gate of SCR2 and is connected at its other end through line 46 to the cathode of SCR2.

The emitter of UT1 is connected to the common point between a resistor 134 and a capacitor C1 which are series connected across buses 48 and 52. Likewise, the emitter of UT2 is connected to the common point between a resistor 136 and a capacitor C2 which are also series connected across the buses 48 and 52. It will be seen that with a potential existing across buses 48 and 52 that C1 will charge to substantially the potential of bus 48 at a rate depending upon the RC of resistor 134 and capacitor C1. When the potential on the upper plate of C1 reaches the critical emitter to base potential of UT1 it suddenly discharges through the E to B1 path of UT1 to render the interbase circuit B2 to B1 conducting thereby subjecting the primary winding of PT1 to a sharp pulse. This induces a pulse in the secondary winding which through lines 38 and 40 subjects SCR1 to a corresponding gating pulse to render the latter conducting. Without the further control to be hereafter described, the aforedescribed action of resistor 134, capacitor C1, UT1 and PT1 will occur repeatedly to subject the gate of SCR1 to a continuous series of gating pulses. It will be apparent that the gate of SCR2 would be subjected to a similar, continuous series of gating pulses through corresponding ation of resistor 136, capacitor C2, UT2 and PT2.

The remainder of firing control circuit 42 now to be described blocks the firing of either one or the other of the unijunction transistors UT1 or UT2 in accordance with the load conditions on the motor. The common point between the emitter terminal of UT1, resistor 134 and capacitor C1 is connected through diode 138 to the point common between the anode of a silicon controlled rectifier SCR4, a resistor 140 which has connection at its other end to bus 48, and a resistor 142 which is connected at its other end in series with a capacitor C3 to the anode of silicon controlled rectifier SCR5. The common point between resistor 136, capacitor C2 and emitter of UT2 is similarly connected through a diode 144 to the point common between a resistor 146 which has its other end connected to bus 48, capacitor C3 and the anode of SCR5.

The cathodes of SCR4 and SCR5 are connected together in series with a resistor 148 to bus 48 and also through a diode 150 to bus 52. The gate of SCR4 is connected in series with a resistor 152 to the point common between the collector of a P-N-P type transistor T6 and a resistor 154 which is connected at its other end to bus 52. The emitter of T6 is connected in series with a resistor 156 to intermediate potential bus 50 and its base is connected in series with a resistor 158 to the adjustable tap of potentiometer 160 which has its resistance element connected in series across buses 50 and 52 with the resistance element of a similar potentiometer 162. A resistor 164 is connected between the point common to the emitter of T6 and resistor 156 and bus 52.

The gate electrode of SCR5 is connected in series with a resistor 166 to the point common between the collector of a P-N-P type transistor T7 and a resistor 168 which has its other end connected to bus 52. T7 has its emitter connected in series with a resistor 170 to bus 50, and its base connected to the point common between a resistor 172, which is connected at its other end to bus 50 and the collector of an N-P-N type transistor T8. The emitter of T8 is connected in series with a resistor 174 to bus 52 and its base is connected to the adjustable tap of potentiometer 162. A resistor 176 is connected between bus 50 and the point common between the emitter of T8 and resistor 174. The point "X" between the resistance elements of the potentiometers 160 and 162 is connected to the point common between a resistor 178 and a capacitor C4 which are connected in series between line 82 and bus 52.

It will be observed that SCR4 and SCR5 together with resistor 142 and capacitor C3 comprise a D.C. static switch of a well known form. Resistor 148 and diode 150 provide a small reverse bias on the cathode to gate circuits of SCR4 and SCR5. When the conduction of transistor T6 reaches a sufficiently high level SCR4 will be rendered conducting and the charge on capacitor C3 will cause the potential of the anode of SCR5 to be so reduced with respect to its cathode that the latter will cease to conduct upon commencement of conduction of SCR4. When SCR4 is rendered conducting, charging of capacitor C1 will be effectively short circuited as the flow of current will then be from bus 48 through resistor 134, and from capacitor C1, through diode 138, SCR4 and diode 150 to bus 52. As a result unijunction UT1 will cease to oscillate and consequently there will be a cesation in the supply of firing pulses to the gate of SCR1.

SCR5 will be turned on when conduction of T8 reaches a given level, and previously conducting SCR4 will be turned off due to the charge build-up on C3 during the conducting period of the latter. Conduction of SCR5 results in preventing conduction of unijunction UT2 which in turn halts the free running production of pulses in PT2 thereby halting the conduction of SCR2. When the potential at point "X" is $\leq 5$ volts, T6 will be rendered fully conducting to effect gating of SCR4 into conduction. When SCR4 is rendered conducting UT1 is blocked against conduction as hereinbefore described and development of pulses in PT1 ceases. Conduction of SCR4, due to the charge on capcitor C3, results in SCR5 being rendered non-conducting. With SCR-5 non-conducting unijunction UT2 is unblocked, to be free running again under the control of resistor 136 and capacitor C2. Accordingly, SCR2 will be gated into conduction. When the potential at "X" is $\geq 6$ volts, T8 will be rendered conducting, which will switch on T7 and SCR5. UT2 will be rendered non-conducting and UT1 will develop pulses in PT1, causing SCR1 to be turned on.

Starting with the motor at rest the closed loop control functions in the following manner. Potentiometer 68 is turned to the desired speed reference level. With no initial speed feedback the output of comparator 60 goes to its maximum level, i.e., 11 volts. Initially there is no armature current through resistor 24, and hence the input to firing circuit 42 is 11 volts. With the input to 42>6 volts the "increase" SCR, is gated as previously described.

With "increase" SCR1 "on" current will begin to flow through resistor 24 at a rate equal to:

$$(E-e_c)/L$$

Where:
E is the potential at bus 10
$e_c$ is the motor countervoltage
L is the inductance of armature a and inductor 22 in series as shown by the portion "A" of FIG. 3. As current increases through resistor 24 the input to 42 will be reduced by the amount of the drop across resistor 24. When the input to 42 is reduced to less than 5 volts the "decrease" SCR2 will be fired. The current will now decrease at a rate equal to:

$$e_c/L$$

The drop across resistor 24 will become less. When the 11 volt output of comparator 60 minus the resistor 24 drop >6 volts "increase" SCR1 will again be fired, then "decrease", etc., resulting in the current wave shapes shown in FIG. 3. The motor will accelerate because of the d.c. component at this wave shape as shown by portion B of FIG. 3.

When the motor speed approaches within a few percent of the desired speed the output of comparator 60 will decrease to a level less than 11 volts that is proportional to the steady state load. Assuming full load the output will reduce to approximately 8 volts. The drop through resistor 24 will substract from this voltage to cause the input to firing circuit 42 to vary between 6 volts and 5 volts as before. This current wave shape is shown by portion C in FIG. 3. If the load is removed from the motor the output of the comparator 60 will go to 5.5 volts, with reference satisfied by speed feedback. With 5.5 volts out of comparator 60 the current through resistor 24 will oscillate about an average value of zero and as before, the input circuit 42 will vary between 6 volts and 5 volts.

If it is now desired to slow the motor the reference potentiometer 68 is turned down and the output of comparator 60 goes to zero. The input to circuit 42 is now governed only by the resistor 24 voltage drop. "Decrease" SCR2 will be fired and current will go negative at the rate of $e_c/L$. When the current reverses, as depicted by portion D of FIG. 3 and builds up to a 6 volt drop "increase" SCR1 will be firing. Inductor 22 will induce a voltage greater than E bringing in SCR3. Current will then flow into resistor EDR in series with SCR3 from the load, and if this current is not sufficient to produce E volts, additional current will flow from 10 through SCR1 to the resistor. The negative current will now take a positive slope as shown at the beginning of section D in FIG. 3.

When a 1 volt change has occurred in the resistor 24 IR drop, "decrease" SCR2 will fire, etc. A negative value of torque will thus be produced to decelerate the motor or to counter an overhauling load. When the motor is brought within a few percent of the desired speed the output of comparator 60 will become greater than 0 volts and will go to a steady state value between 0 volts and 11 volts, 0 to 5.5 volts being the negative torque range, 5.5 volts to 11 volts being the positive torque range.

Figure 3:
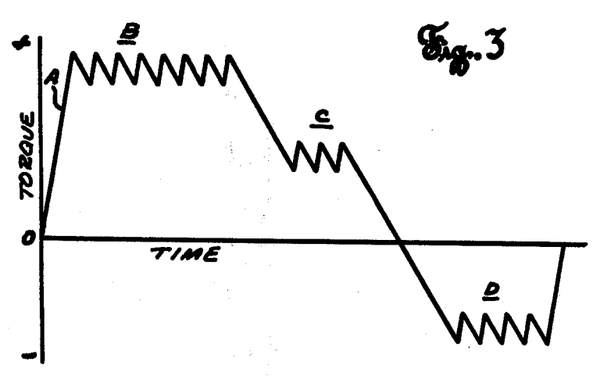
FIG. 3 is a graph depicting changes in current supplied to the motor armature during various load conditions on a motor incorporating the system shown in FIGS. 1 and 2.

If due to pump back of current to bus 10 through diode 28 and resistor 30 the potential of bus 10 exceeds the preset value to which detector circuit 84 responds the latter will effect firing of SCR3 as herebefore described to cause dissipation of the excess energy in resistor EDR. Thereafter when the value of the negative or regenerative motor current subsides SCR2 will again be brought into conduction, and so long as the overhauling condition remains there will be conduction of SCR2 alternating with conduction of SCR3 and SCR1. The portion D of the curve of FIG. 3 depicts the operations of the control system under a steady state overhauling load. Those parts of the "saw teeth" slanting upwardly to the right in portion D indicates an algebraic increase in current during conduction of SCR3 and consequent dissipation of regenerative energy in resistor EDR while those parts slanting downwardly to the right depict the algebraic decrease in regenerative current during the conducting periods of SCR2.

Figure 4:
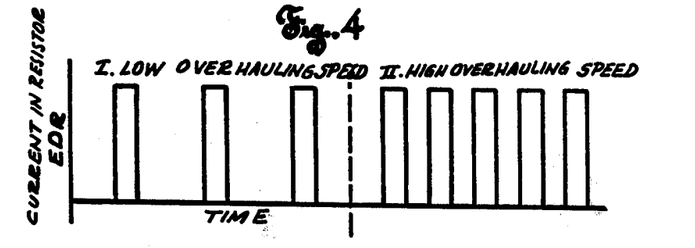
FIG. 4 is another graph showing current vs. time in a portion of the system under different overhauling load conditions.

It will be apparent that the energy dissipated in resistor EDR will be directly proportional to speed. As shown in FIG. 4 the current through EDR will be discontinuous in accordance with the conduction of SCR3. At a relatively low overhauling speed, the current through EDR will have the pattern shown by the Portion I in FIG. 4, while at a higher overhauling speed SCR3 will conduct more frequently to effectively connect EDR in circuit correspondingly more frequently as shown by Portion II.

Figure 5:
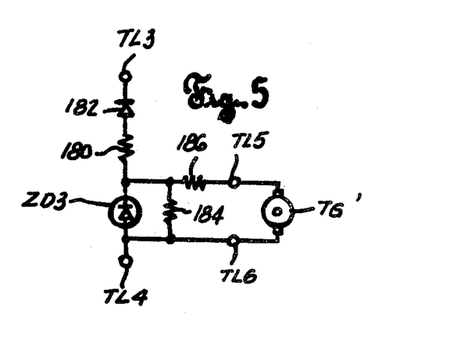
FIG. 5 diagrammatically depicts an optional addition that can be made to that part of the system shown in FIG. 2b.

FIG. 5 discloses a modification that can be used with the comparator circuit shown in FIGS. 2a and 2b to automatically change the voltage at which SCR5 will be triggered into conduction when the motor is running at slow speeds under a predetermined value. As will be hereinafter apparent, this modification makes for smoother torque by decreasing the voltage differential between turn-on and turn-off of SCR5.

The modification comprises a zener diode ZD3 connected in series with a resistor 180 and diode 182 between terminals TL3 and TL4, with the latter being connected to terminals TL1 and TL2 of FIG. 2b when the modification is used. Further, a resistor 184 is connected in parallel with ZD3 and a resistor 186 is connected to the point common between the cathode terminal of ZD3, and a voltage input terminal TL5. The point common between terminal TL4, the anode terminal of ZD3 and the lower end of resistor 184 is connected to another voltage input terminal TL6. Terminals TL5 and TL6 are connected to a tachometer generator TG' driven by armature a of motor M. TG' can be the same or separate from tachometer generator TG previously described.

With suitable selection of the values for resistors 172 and 174, the voltage at terminals TL1-TL3 will be normally 5 volts relative to bus 52. Now if point "X" rises to 5.5 volts transistor T8 will be triggered into conduction. When the potential derived from TG' applied between terminals TL3 and TL4 increases to 5.5 volts ZD3 breaks down to maintain the potential at TL1-TL3 constant at 5.5 volts even though the voltage generated by TG' continues to increase with motor speed. It will thus be seen at some predetermined speed the voltage at TL1-TL3 will proportionately shift from 5 to 5.5 volts. Consequently the voltage at point "X" will have to increase from 5.5 volts to 6 volts before transistor T8 will be rendered conducting to initiate the aforedescribed turn-off of SCR2.

It will be seen from the foregoing description of the circuit modification that there will be an automatic increase in the firing circuit potential differential of ½ to 1 volt affording turn-on and turn-off of SCR2. The potential at point "X" affording turn-on of SCR2 remains constant, but that initiating turn-off shifts ½ volt as a function of TG output, until such output as divided by resistors 184 and 182 exceeds the voltge of zener diode ZD3. Above this TG' output the differential will remain constant at 1 volt. This proportionate decrease in differential at slow motor speeds effectively shortens the time duration when SCR2 is conducting which tends to be long in comparison with the duration of conduction of SCR1.

Figure 7:
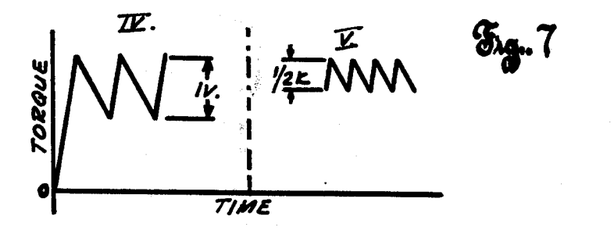
FIG. 7 is a graph showing current vs. time with and without use of the optional addition of FIG. 5.

Portions IV and V of FIG. 7 depict the effect in change of turn-on turn-off differential of SCR2 at very slow motor speeds. Portion IV depicts the typical "saw tooth" conduction period for SCR1 and SCR2 at very slow speeds without the use of the circuit modification of FIG. 5, whereas the portion V depicts the same conditions with the circuit modification being used. The motor current waveshape is the same as shown in FIG. 4. The D.C. portion of the current waveshape produces useful torque. The effect of this alternating torque varies inversely with the frequency and directly with the amplitude. With the differential cut-down to ½ volt as shown in portion V the "on" periods of SCR are markedly reduced, and thus the frequency of the torque distrubance increases and its amplitude lessens. Accordingly, the decrease in differential at very slow motor speeds affords a smoother armature torque. When the speed of the motor increases the duration of conduction of SCR2 relative to SCR1 decreases and hence the differential will proportionately increase to 1 volt to decrease the frequency of turn-on and -off of SCR1 and SCR2.

Figure 6:
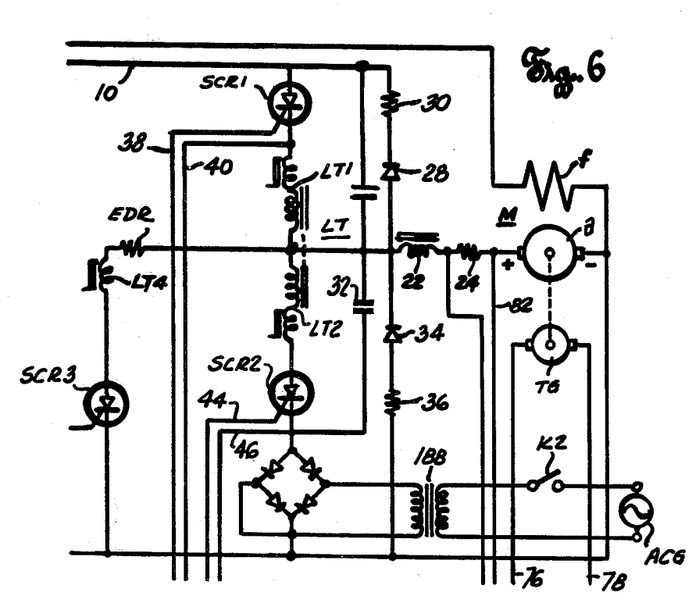
FIG. 6 is a fragmentary diagrammatic showing of a modified form of system depicted in FIGS. 1 and 2.

FIG. 6 illustrates another modification which can be made to the system of FIGS. 2a and 2b that affords improvement in the system response when there is a demand fo "decrease" in motor torque, and also affords a slow, reverse operation speed for the motor. As shown in FIG. 6, this modification comprises a full-wave rectifier bridge FB which has its D.C. terminals connected between the cathode of SCR2 and bus 12. The A.C. input terminals of bridge FB are connected to the secondary winding of a transformer 188 which has its primary winding connected through a switch K2 to a source of A.C. potential ACG. With switch K2 open the modified system of FIG. 6 operates in the same manner as that of FIG. 2a and 2b with bridge FB providing unimpeded flow of current through from SCR2 to bus 12.

In the system of FIG. 2, and in modified system of FIG. 6 with switch K2 open, the torque response, i.e., time required for 100% change in torque, is in accordance with the relationship hereinbefore set forth. Now if K2 is closed in the modified system of FIG. 6 when the motor is operating at slow speed, a D.C. potential is developed between the D.C. terminals of FB and bus 12, that relative to armature a of motor M is in a direction to aid the countervoltage in decreasing (algebraically) current in the armature when SCR2 is fired. Now the rate of torque decrease will be in accordance with the following relationship:

$$(E_c + E_{FB})/L$$

Where:

$E_{FB}$ = voltage from D.C. terminal of bridge FB to bus 12

Accordingly, the rate of change in the decrease torque direction will be markedly improved. No effect or change in operation of the basic feedback system, except the above mentioned, is involved.

If when using the modification of FIG. 6 with the omplete system of FIG. 2 if the slider of potentiometer 68 is suitably adjusted to near an extreme counterclockwise position on the resistance element it will be at a negative potential with respect to common bus 52. With switch K2 closed the system will extend its regulated speed range to include slow speed, reverse running of the motor.

I claim:

1. The combination with a rectifier A.C. to D.C. supply source having high and low potential D.C. output buses, a D.C. motor, a tapped inductor, a pair of controlled electronic devices having their main conducting paths connected respectively between the opposite ends of said inductor and said output buses and arranged to afford current flow from high to low potential, a second inductor connected from the tap of said tapped inductor in series with the armature of said motor to the low potential bus, pairs of parallel connected capacitors and diodes connected between the tap of said tapped inductor and said buses with the diodes poled for current flow opposite to that of said electronic devices and means in circuit with said electronic devices for effecting alternate conduction of the latter, of energy absorbing means in circuit with the motor armature circuit and control means responsive to a predetermined increase in the potential between said buses during overhauling motor operation to bypass motor armature current through said energy absorbing means until the electronic device connected to the low potential bus is thereafter rendered conducting.

2. The combination according to claim 1, wherein said energy absorbing means comprises a resistor connected to the tap of said tapped inductor and wherein said control means comprises a third controlled electronic device having its main conducting path connected in series with said resistor to said low potential bus.

3. The combination according to claim 2, wherein said energy absorbing means further comprises an inductor connected in series with said resistor and the main conducting path of said third controlled electronic device.

4. The combination according to claim 3, wherein said control means connected in circuit with the control element of said third controllable electronic device and said high and low potential buses is responsive to build-up of potential between said buses a predetermined amount above normal supply potential to render said third electronic device conducting.

5. The combination according to claim 2, wherein each of said electronic devices is a semiconductor controlled rectifier.

6. The combination with a rectifier A.C. to D.C. supply source having high and low potential D.C. output buses, a D.C. motor, a tapped inductor, a pair of controlled electronic devices having their main conducting paths connected respectively between the opposite ends of said inductor and said output buses and arranged to afford current flow from high to low potential, a second inductor connected from the tap of said tapped inductor in series with the armature of said motor to the low potential bus, pairs of parallel connected capacitors and diodes connected between the tap of said tapped inductor and said buses with the diodes poled for current flow opposite to that of said electronic devices, of a pair of conduction control means respectively in circuit with each of said electronic devices, means responsive to instantaneous values of motor load current to provide a control signal which is a function of said motor load current, and means in circuit with each of said conduction control means and responsive to said control signal, said last mentioned means initiating conduction of one of said electronic devices whenever said control signal exceeds a predetermined magnitude and maintaining such conduction until said control signal decreases below a predetermined lower magnitude, and initiating alternate conduction of the other of said electronic devices whenever said control signal decreases to said lower magnitude and maintaining such alternate conduction until the control signal increases to the first mentioned predetermined magnitude.

7. The combination according to claim 6 wherein said means responsive to instantaneous values of motor load current further includes means providing a reference signal, means providing an error signal varying in accordance with the difference between said reference signal and said motor speed signal, and means providing a control signal which is the algebraic resultant between said error signal and instantaneous values of motor load current.

8. The combination according to claim 7 together with means acting when the motor speed decreases below a predetermined value to proportionaly increase the predetermined lower magnitude of said control signal at which conduction of said other electronic device is initiated to decrease the differential between the alternate conduction of said electronic devices.

9. The combination according to claim 6, together with means connected in circuit between one of said controlled electronic devices and the low potential bus of said output buses to provide a D.C. potential aiding that of the motor counter voltage.

10. The combination according to claim 9, wherein the last specified means comprises a full-wave rectifier bridge having its D.C. terminal connected to said one of said controlled electronic devices and said low potential bus and means for selectively energizing the A.C. terminals of said rectifier bridge.

11. The combination according to claim 6, together with energy absorbing means comprising a resistor, a third controlled electronic device connected in series with said resistor between the tap of said tapped inductor and the low potential bus of said output buses, and means responsive to a predetermined increase in potential between said output buses to render said third controlled electronic device conducting to complete circuit from the motor armature through said resistor.

* * * * *